United States Patent
Qiu et al.

(10) Patent No.: US 10,681,921 B2
(45) Date of Patent: Jun. 16, 2020

(54) ARTIFICIAL DIET FOR GHOST MOTH LARVAE AND PREPARATION METHOD THEREOF

(71) Applicant: GUANGDONG INSTITUTE OF APPLIED BIOLOGICAL RESOURCES, Guangzhou, Guangdong (CN)

(72) Inventors: Xuehong Qiu, Guangzhou (CN); Richou Han, Guangzhou (CN)

(73) Assignee: GUANGDONG INSTITUTE OF APPLIED BIOLOGICAL RESOURCES, Guangzhou, Guangdong (CN)

( * ) Notice: Subject to any disclaimer, the term of this patent is extended or adjusted under 35 U.S.C. 154(b) by 187 days.

(21) Appl. No.: 15/775,157

(22) PCT Filed: Feb. 17, 2017

(86) PCT No.: PCT/CN2017/073893
§ 371 (c)(1),
(2) Date: May 10, 2018

(87) PCT Pub. No.: WO2018/076576
PCT Pub. Date: May 3, 2018

(65) Prior Publication Data
US 2018/0368444 A1    Dec. 27, 2018

(30) Foreign Application Priority Data

Oct. 25, 2016 (CN) .......................... 2016 1 0938312

(51) Int. Cl.

| | |
|---|---|
| A61K 36/00 | (2006.01) |
| A23K 10/16 | (2016.01) |
| A23K 10/37 | (2016.01) |
| A23K 20/105 | (2016.01) |
| A23K 20/111 | (2016.01) |
| A23K 50/90 | (2016.01) |
| A23K 20/163 | (2016.01) |
| A23K 20/174 | (2016.01) |
| A23K 20/195 | (2016.01) |
| A23K 20/147 | (2016.01) |
| A23K 10/30 | (2016.01) |
| A23K 20/158 | (2016.01) |

(52) U.S. Cl.
CPC .............. *A23K 10/16* (2016.05); *A23K 10/30* (2016.05); *A23K 10/37* (2016.05); *A23K 20/105* (2016.05); *A23K 20/111* (2016.05); *A23K 20/147* (2016.05); *A23K 20/163* (2016.05); *A23K 20/174* (2016.05); *A23K 20/195* (2016.05); *A23K 50/90* (2016.05); *A23K 20/158* (2016.05); *Y02P 60/877* (2015.11)

(58) Field of Classification Search
CPC ...................................................... A61K 36/00
See application file for complete search history.

(56) References Cited

FOREIGN PATENT DOCUMENTS

| | | |
|---|---|---|
| CN | 102228159 A | 11/2011 |
| CN | 102356811 A1 * | 2/2012 |
| CN | 102813081 A | 12/2012 |
| CN | 103478486 A * | 1/2014 |
| CN | 105795168 A * | 7/2016 |
| CN | 105795168 A | 7/2016 |

OTHER PUBLICATIONS

International Search Report dated Jul. 28, 2017, issued in counterpart application No. PCT/CN2017/073893. (2 pages).
Wang, "The preliminary study on artificial rearing Hepialusspp", Entomological Knowledge, 2002 39(2), pp. 144-146; cited in the specification, w/English Abstract (4 pages).
Buenz et al., "The traditional Chinese medicine Cordyceps sinensis and its effects on apoptotic homeostasis", Journal of Ethnopharmacology, 2005, 96, pp. 19-29;cited in the specification, w/English Abstract (12 pages).
Sung et al., "Phylogenetic classification of Cordyceps and the clavicipitaceous fungi", Studies in Mycology, 2007, 57, pp. 5-59;cited in the specification, w/English Abstract (56 pages).
Yin et al., "Thinking on the protection, regeneration and sustainable utilization of Cordyceps sinensis", China Journal of Chinese Materia Medica, Mar. 2011,vol. 36, No. 6, pp. 814-816; cited in the specification, w/English Abstract (4 pages).
Yue et al., "The Artificial Cultivation of Medicinal Caterpillar Fungus, Ophiocordyceps sinensis (*Ascomycetes*): A Review", International Journal of Medicinal Mushrooms, 2013, 15(5): pp. 425-434; cited in the specification, w/English Abstract (11 pages).

* cited by examiner

*Primary Examiner* — Qiuwen Mi
(74) *Attorney, Agent, or Firm* — Westerman, Hattori, Daniels & Adrian, LLP

(57) ABSTRACT

An artificial diet for ghost moth larvae and a preparation method thereof. The artificial diet comprises root of *Polygonum viviparum*, soybean powder, bran, yeast powder, sucrose, casein, agar, water, choline chloride, ascorbic acid, sorbic acid, nipagin and multivitamin. After being fed for 60 days, third-instar larvae fed with the artificial diet showed an average survival rate of up to 92.67%, higher than those fed with carrots with an average survival rate of 90.33%. After being fed for 140 days, the larvae fed with the artificial diet showed an average survival rate of up to 86.67%, significantly higher than those fed with carrots with an average survival rate of 73.67%. Also, the larvae fed with the artificial diet showed significant increase in body weight, without the contamination of bacterium and fungi.

6 Claims, 2 Drawing Sheets

ARTIFICIAL DIET FOR GHOST MOTH LARVAE AND PREPARATION METHOD THEREOF

FIELD OF THE INVENTION

The present invention relates to the field of insect diet, and particularly to an artificial diet for ghost moth larvae and a preparation method thereof.

BACKGROUND OF THE INVENTION

*Ophiocordyceps sinensis* (Berk.) Sung (synonym: *Cordyceps sinensis* (Berk.) Sacc.), classified under phylum Ascomycota, class Sordariomycetes, order Hypocreales, family Ophiocordycipitaceae and genus *Ophiocordyceps*, is a complex of a larva corpus and fungal stroma which originates from the larva of Hepialidae parasitized by *Cordyceps* spp. (Sung et al., 2007; Yue et al., 2013.). As a traditional Chinese medicine having pharmacological effects such as immunoregulation, anti-bacteria effect, antitumor effect, anti-aging effect, and reducing blood sugar and fat, it is recognized as "the three treasures of traditional Chinese medicine" together with *ginseng* and pilose antler.

*Ophiocordyceps sinensis* is a species endemic to the Qinghai-Tibet Plateau and merely found in four countries, China, Bhutan, India and Nepal. In China, it is usually found at an altitude of 3500 to 5000 meters, mainly in provinces such as Xizang, Sichuan, Qinghai, Yunnan, and Gansu (Yue et al., 2013). As the effects of *Ophiocordyceps sinensis* have been verified, it has gained worldwide tremendous attention (Buenz et al., 2005) resulting in an increase in global sales. Due to special habitat requirements, limited resources and high price, *Ophiocordyceps sinensis* resource has been overexploited such that the production in most areas has been decreased to below 10% of the production of 25 years ago (Yin et al., 2011), and thus, the increasing demand has outstripped the supply. Resource exhaustion, huge demand and government protection have caused a rapid rise of prize thereof. Moreover, wild *Ophiocordyceps sinensis* has been listed as a Class II protected species in China. In order to protect the ecosystems of the Qinghai-Tibet Plateau and the *Ophiocordyceps sinensis* resource and provide extensive use of *Ophiocordyceps sinensis* in human health, artificial cultivation is the only option.

Artificial rearing of ghost moth, which is a host insect of *Cordyceps* spp., is an important part of the artificial cultivation of *Ophiocordyceps sinensis*. The priority for artificial rearing of host insects is to provide diet for the insects. At present, natural feeds, mainly pieces of roots of Polygonaceae plants or carrots, are used in the rearing of ghost moths. However, natural feeds have problems such as huge limitation from the natural environment and seasonal supply shortage. Due to individual differences of the plants, it is difficult to achieve standardization. Moreover, since complete sterilization is unavailable, they are prone to pathogen contamination. Therefore, there is an urgent need to develop an artificial diet for ghost moths, which can avoid these problems and allow the ghost moths to grow regularly with consistent physiological features.

SUMMARY OF THE INVENTION

In view of the above concerns, the object of the present invention is to provide an artificial diet for ghost moth larvae and a preparation method thereof.

The first object of the present invention is to provide an artificial diet for ghost moth larvae, which comprises root of *Polygonum viviparum* (PV), soybean powder, bran, yeast powder, sucrose, casein, agar, water, choline chloride, ascorbic acid, sorbic acid, nipagin and multivitamin.

Preferably, the artificial diet comprises, by weight, 0-100 parts of PV root (root of *Polygonum viviparum*), 25-50 parts of soybean powder, 25-50 parts of bran, 10-18 parts of yeast powder, 8-20 parts of sucrose, 10-18 parts of casein, 10-15 parts of agar, 500 parts of water, 0.08-0.2 parts of choline chloride, 4-6 parts of ascorbic acid, 2-5 parts of sorbic acid, 2-5 parts of nipagin and 6-10 parts of multivitamin.

Preferably, the artificial diet comprises, by weight, 0-75 parts of PV root, 25-50 parts of soybean powder, 25-50 parts of bran, 15 parts of yeast powder, 10 parts of sucrose, 15 parts of casein, 10 parts of agar, 500 parts of water, 0.1 parts of choline chloride, 4.5 parts of ascorbic acid, 3 parts of sorbic acid, 3 parts of nipagin and 8 parts of multivitamin.

Preferably, the artificial diet comprises, by weight, 25-75 parts of PV root, 25 parts of soybean powder, 25 parts of bran, 15 parts of yeast powder, 10 parts of sucrose, 15 parts of casein, 10 parts of agar, 500 parts of water, 0.1 parts of choline chloride, 4.5 parts of ascorbic acid, 3 parts of sorbic acid, 3 parts of nipagin and 8 parts of multivitamin.

Preferably, the artificial diet comprises, by weight, 75 parts of PV root, 25 parts of soybean powder, 25 parts of bran, 15 parts of yeast powder, 10 parts of sucrose, 15 parts of casein, 10 parts of agar, 500 parts of water, 0.1 parts of choline chloride, 4.5 parts of ascorbic acid, 3 parts of sorbic acid, 3 parts of nipagin and 8 parts of multivitamin.

Preferably, the PV root is dried PV root.

The artificial diet further comprises antibiotic, and an amount of the antibiotic is 0.01% by weight of the artificial diet.

The antibiotic comprises cephalosporin, streptomycin sulfate and chloramphenicol, with a mass ratio of 2:2:1.

The second object of the present invention is to provide a method for preparing the artificial diet, which comprises the following steps: providing the ingredients according to the formulation of the artificial diet; smashing the PV root and the multivitamin into powder, mixing the PV root powder, the soybean powder, the bran, the yeast powder, the sucrose, the casein, the agar and the water, and sterilizing the mixture; after the mixture is cooled to 55-60° C., adding the multivitamin, the choline chloride, the ascorbic acid, the sorbic acid and the nipagin into the mixture, and stirring the mixture to obtain the artificial diet for ghost moth larvae.

After being fed for 60 days, third-instar larvae fed with the artificial diet showed an average survival rate of up to 92.67%, higher than those fed with carrots with an average survival rate of 90.33%. After being fed for 140 days, the larvae fed with the artificial diet showed an average survival rate of up to 86.67%, significantly higher than those fed with carrots with an average survival rate of 73.67%. Also, the larvae fed with the artificial diet showed significant increase in body weight, without the contamination of bacterium and fungi. The artificial diet of the present invention, have advantages such as easily accessible ingredients, simple preparation method, low cost, long shelf life, larvae survival rate close to or even higher than those fed with carrots, and significant increase in body weight of larvae, and thus it helps to realize large-scale rearing of ghost moths.

DETAILED DESCRIPTION OF THE EMBODIMENTS

Figure 1:
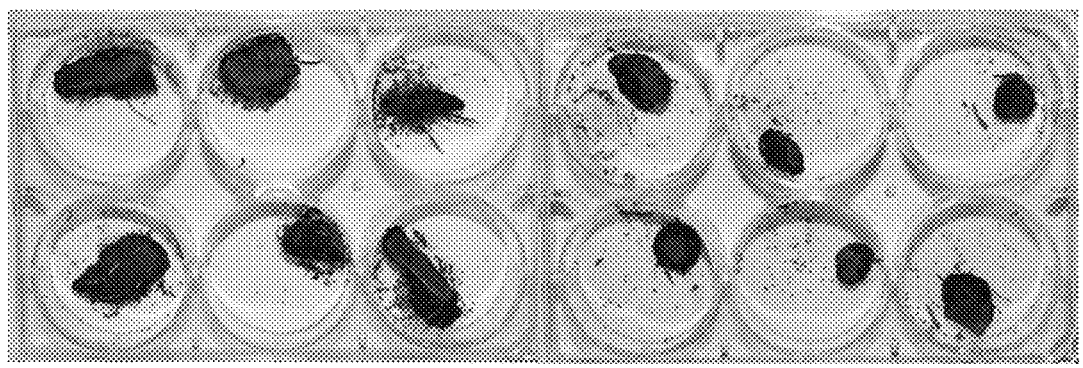
FIG. 1 shows ghost moth larvae fed with pieces of PV root.
Figure 2:
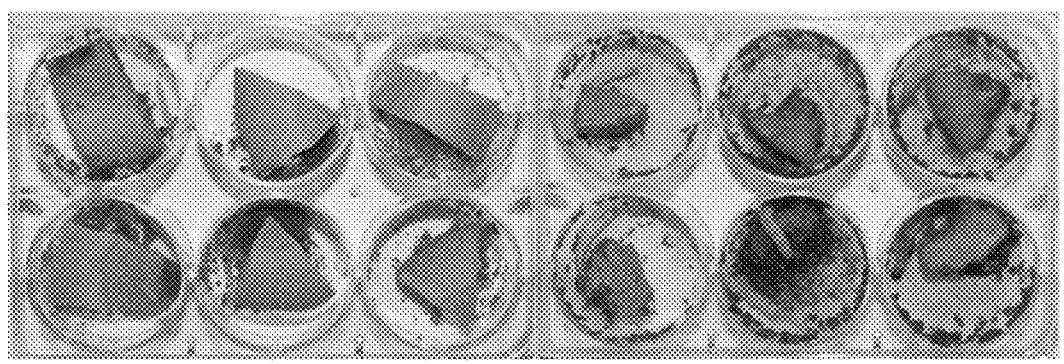
FIG. 2 shows ghost moth larvae fed with carrots.
Figure 3:
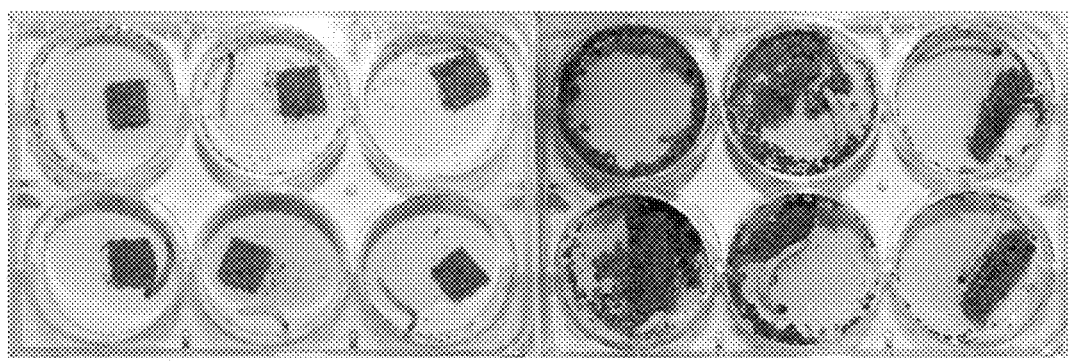
FIG. 3 shows ghost moth larvae fed with artificial diet AD-1.
Figure 4:
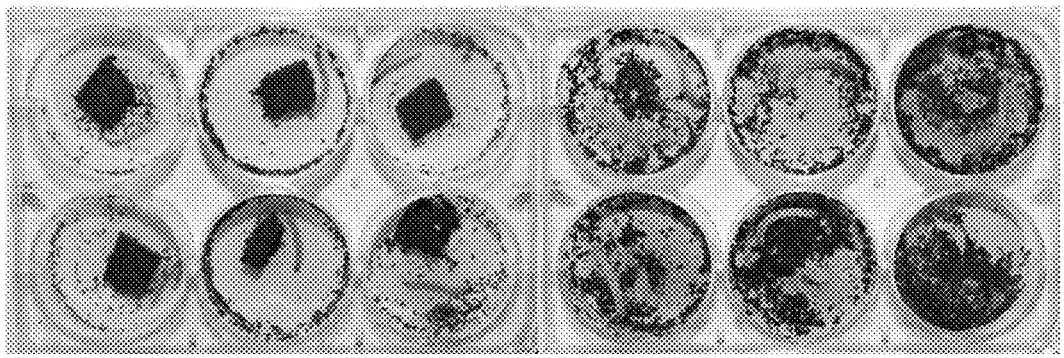
FIG. 4 shows ghost moth larvae fed with artificial diet AD-2.
Figure 5:
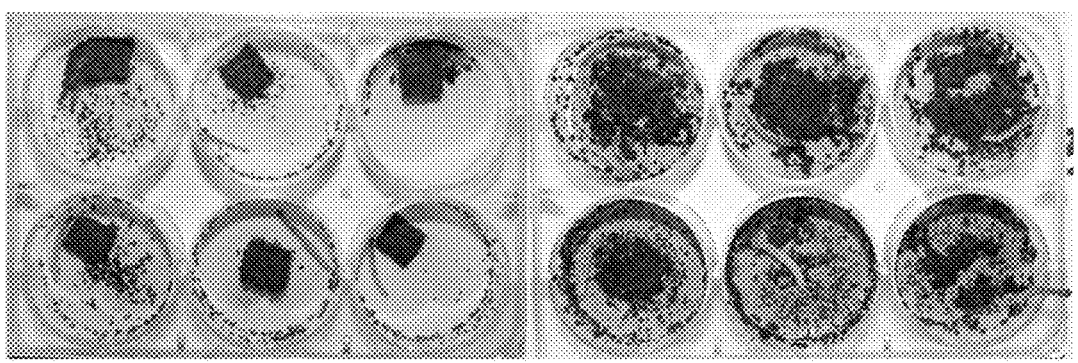
FIG. 5 shows ghost moth larvae fed with artificial diet AD-3.
Figure 6:
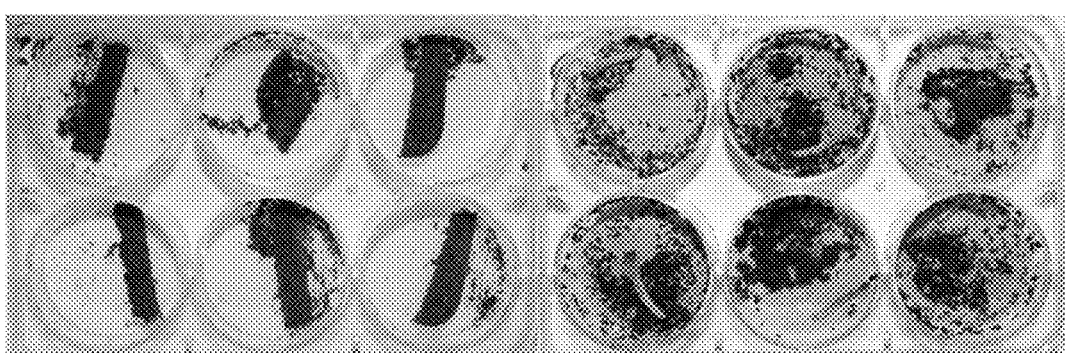
FIG. 6 shows ghost moth larvae fed with artificial diet AD-4.

The following embodiments are explanation for the present invention, but not used for limiting the present invention.

Embodiment 1

1. Materials and Method 1.1 Insects

Third-instar larvae of ghost moth, having an average body weight of 11.6±1.7 mg.

1.2 Plants

PV roots, collected from Kandding of Sichuan Province, were washed with water, air-dried, and then stored at 4° C.; before used, they were cut into pieces after the root hair were removed; a fresh powder sample is obtained by smashing the pieces of PV roots into powder; a dried powder sample, which could be preserved at 4-12° C. for two years or more, is obtained by drying the PV roots at a high temperature to a constant weight and then smashing into powder. Carrots were purchased from Guangzhou Shengyinghui E-Commerce Co., Ltd.; after a surface sterilization, the peels of the carrots were removed, and then the carrots were cut into small pieces and stored at 4° C.

1.3 Artificial Diets and Preparation Method

Formulations of the artificial diets were as shown in Table 1.

TABLE 1

Formulation

| Ingredient | Artificial Diets | | | |
|---|---|---|---|---|
| | AD-1 | AD-2 | AD-3 | AD-4 |
| PV root, | 0 g | 75 g (Dried powder) | 75 g (Fresh powder) | 25 g (Dried powder) |
| Soybean powder | 50 g | 25 g | 25 g | 25 g |
| Bran | 50 g | 25 g | 25 g | 25 g |
| Yeast powder | 15 g | 15 g | 15 g | 15 g |
| Sucrose | 10 g | 10 g | 10 g | 10 g |
| Casein | 15 g | 15 g | 15 g | 15 g |
| Agar | 10 g | 10 g | 10 g | 10 g |
| Water | 500 g | 500 g | 500 g | 500 g |
| Choline chloride | 0.1 g | 0.1 g | 0.1 g | 0.1 g |
| Ascorbic acid | 4.5 g | 4.5 g | 4.5 g | 4.5 g |
| Sorbic acid | 3 g | 3 g | 3 g | 3 g |
| Nipagin | 3 g | 3 g | 3 g | 3 g |
| Multivitamin | 6 pellets | 6 pellets | 6 pellets | 6 pellets |

The artificial diets were prepared by the following steps:

1) Mixing the PV root powder, the soybean powder, the bran, the yeast powder, the sucrose, the casein, the agar and the water, sterilizing the mixture at 121° C. under high pressure for 20-30 minutes. Adding the other ingredients into the mixture after it is cooled to 55-60° C.

2) Adding the multivitamin into the mixture on a clean bench. The multivitamin used was Centrum® multivitamin purchased from Wyeth Company, 1.33 g each pellet. The multivitamin was smashed into powder before added into the mixture.

3) Adding the choline chloride, the ascorbic acid, the sorbic acid and the nipagin into the mixture.

4) Adding cephalosporin (with a final concentration of 50 μg/g), streptomycin sulfate (with a final concentration of 50 μg/g) and chloramphenicol (with a final concentration of 25 μg/g) into the mixture.

5) Stirring the mixture and then pouring the mixture into a sterilized plastic box. Sealing the box after the mixture coagulated. The artificial diet could be preserved at 4° C. for two months or more.

1.4 Experiment

Sterilized 6-well culture plates with two pieces of filter paper disposed in each well were used. In each well, 200 μL of water was added followed by addition of a piece of the artificial diet, a piece of PV root or a piece of carrot, and then one third-instar ghost moth larva was transferred into the well. Each larva was reared at 9-13° C., and transferred to a 9 cm culture dish after it grew to the fifth instar. Six treatments were established, for PV roots, carrots, and the artificial diets AD-1, AD-2, AD-3 and AD-4. The experiment was performed with 100 larvae for each treatment, and three duplicates for each treatment.

2. Results and Discussion After being reared at 9-13° C. for 60 days, survival rates of the larvae fed with PV roots, carrots, and the artificial diets AD-1, AD-2, AD-3 and AD-4 were respectively 17.33%, 90.33%, 81.67%, 92.67%, 89% and 85.67%, and average weight gain were respectively 6.87, 70.87, 32.94, 47.99, 41.06 and 34.60 mg per larva (Table 2). Regarding the survival rate, the group of artificial diet AD-2 in which dried powder of PV roots was added showed the highest survival rate, slightly higher than the group of carrots, and significantly higher than the groups of PV roots, AD-1, AD-3 and AD-4; there was no significant difference between the group of AD-3 and the group of carrots. Regarding the weight gain, the group of carrots showed the highest value, significantly higher than the groups of PV roots and artificial diets; the group of artificial diet AD-2 showed the second highest value, and significantly higher than the group of PV roots and other artificial diets; the group of artificial diet AD-1 in which PV roots powder was not added showed a weight gain lower than other groups of artificial diets AD-2, AD-3 and AD-4 in which PV roots powder was added; the group of PV roots showed the lowest weight gain of larvae, which is only 6.87 mg per larva.

TABLE 2

Survival rate and weight gain of ghost moth larvae fed with different diet for 60 days

| Diet | Survival rate (%) | Weight gain(mg/larva) |
|---|---|---|
| PV roots | 17.33 ± 2.08 a | 6.87 ± 1.41 a |
| Carrots | 90.33 ± 0.58 de | 70.87 ± 2.28 e |
| AD-1 | 81.67 ± 1.53 b | 32.94 ± 1.52 b |
| AD-2 | 92.67 ± 1.53 e | 47.99 ± 3.07 d |
| AD-3 | 89.00 ± 2.00 d | 41.06 ± 1.20 c |
| AD-4 | 85.67 ± 2.52 c | 34.60 ± 2.52 b |

The values in the table are indicated as mean ± SE.
Values accompanied by different letters within each column are significantly different (Duncan test, P < 0.005).

After being reared at 9-13° C. for 140 days, survival rates of the larvae fed with PV roots, carrots, and the artificial diets AD-1, AD-2, AD-3 and AD-4 were respectively 0%, 73.67%, 62.00%, 86.67%, 74.67% and 63.33%, and average weight gains of the larvae fed with PV roots, carrots, and the artificial diets AD-1, AD-2, AD-3 and AD-4 were respectively 311.01, 175.58, 270.62, 222.52 and 190.13 mg per larva (Table 3). After 140 days of rearing, the group of artificial diet AD-2 showed the highest survival rate which was up to 86.67% and significantly higher than other groups. The group of artificial diet AD-3 showed the second highest survival rate which was 74.67% and slightly higher than the group of carrots which was 73.67%. There was no significant difference between the group of AD-1 and the group of AD-4 showing survival rate of 62.00% and 63.33% respectively. No larva survived in the group of PV roots. Regarding the body weights of larvae, the group of carrots showed the highest weight gain significantly higher than the groups of artificial diets. The group of artificial diet AD-2 showed the second highest weight gain significantly higher than the groups of other artificial diets. There was no significant difference between the group of AD-1 and the group of AD-4.

Results showed that, the artificial diets allow the ghost moth larvae to grow and even improve the survival rate of the larvae; adding powder of PV roots into the artificial diet could improve the survival rate and weight gain of the larvae.

During the feeding, carrots were prone to rot and turn dark due to high water content; the artificial diets were soft and loose which facilitated the larvae to bore in and eat, and could avoid the above problem. By comparing the four artificial diets, it was found that larvae preferred the diet with PV roots, and the survival rate and weight gain of larva increased as the content of PV roots increased. In view of the survival rate and weight gain of larva, the artificial diet AD-2 formulation was the best.

TABLE 2

Survival rate and weight gain of ghost moth larvae fed with different diet for 140 days

| Diet | Survival rate (%) | Weight gain(mg/larva) |
| --- | --- | --- |
| PV roots | 0.00 ± 0.00 a | / |
| Carrots | 73.67 ± 2.08 c | 311.01 ± 14.22 d |
| AD-1 | 62.00 ± 3.00 b | 175.58 ± 8.94 a |
| AD-2 | 86.67 ± 2.52 d | 270.62 ± 9.16 c |
| AD-3 | 74.67 ± 1.53 c | 222.52 ± 9.35 b |
| AD-4 | 63.33 ± 2.52 b | 190.13 ± 6.87 a |

The values in the table are indicated as mean ± SE.
Values accompanied by different letters within each column are significantly different (Duncan test, $P < 0.005$).

Embodiment 2

Used in this embodiment was an artificial diet AD-5, comprising, by weight, 100 parts of PV root (dried powder), 25 parts of soybean powder, 25 parts of bran, 10 parts of yeast powder, 8 parts of sucrose, 10 parts of casein, 15 parts of agar, 500 parts of water, 0.08 parts of choline chloride, 4 parts of ascorbic acid, 2 parts of sorbic acid, 2 parts of nipagin and 6 parts of multivitamin.

PV roots, collected from Kandding of Sichuan Province, were washed with water, then dried at a high temperature to a constant weight, and smashed into powder to obtain a dried powder sample which could be preserved at 4-12° C. for two years or more. Carrots were purchased from Guangzhou Shengyinghui E-Commerce Co., Ltd.; after a surface sterilization, the peels of the carrots were removed, and then the carrots were cut into small pieces and stored at 4° C.

The artificial diet AD-5 was prepared by the same method of embodiment 1, and could be preserved at 4° C. for two months or more.

Experiment (identical with that in embodiment 1) showed that, after being reared at 9-13° C. for 140 days, the larvae fed with the artificial diet AD-5 showed an survival rate close to that of the larvae fed with carrots and a significant weight gain.

Embodiment 3

Used in this embodiment was an artificial diet AD-6, comprising, by weight, 75 parts of PV root (dried powder), 25 parts of soybean powder, 25 parts of bran, 18 parts of yeast powder, 20 parts of sucrose, 18 parts of casein, 15 parts of agar, 500 parts of water, 0.2 parts of choline chloride, 6 parts of ascorbic acid, 5 parts of sorbic acid, 5 parts of nipagin and 10 parts of multivitamin.

PV roots, collected from Kandding of Sichuan Province, were washed with water, then dried at a high temperature to a constant weight, and smashed into powder to obtain a dried powder sample which could be preserved at 4-12° C. for two years or more. Carrots were purchased from Guangzhou Shengyinghui E-Commerce Co., Ltd.; after a surface sterilization, the peels of the carrots were removed, and then the carrots were cut into small pieces and stored at 4° C.

The artificial diet AD-6 was prepared by the same method of embodiment 1, and could be preserved at 4° C. for two months or more.

Experiment (identical with that in embodiment 1) showed that, after being reared at 9-13° C. for 140 days, the larvae fed with the artificial diet AD-6 showed an survival rate close to that of the larvae fed with carrots and a significant weight gain.

There were few reports about artificial diets for ghost moths. Wang (2002) reported that, four artificial diets were prepared to feed fifth-instar larvae, and after fed with the artificial diets for 90 days, the larvae showed a survival rate of only 36.66% to 60%. In contrast, fed with the artificial diet of the present invention, the larvae showed a survival rate close to or even higher than those fed with carrots and a significant weight gain. Also, since the artificial diet of the present invention consists of easily accessible ingredients, it helps to realize large-scale rearing of ghost moths.

The invention claimed is:

1. An artificial diet for ghost moth larvae, comprising by weight, 25-75 parts of root of *Polygonum viviparum*, 25 parts of soybean powder, 25 parts of bran, 15 parts of yeast powder, 10 parts of sucrose, 15 parts of casein, 10 parts of agar, 500 parts of water, 0.1 parts of choline chloride, 4.5 parts of ascorbic acid, 3 parts of sorbic acid, 3 parts of nipagin and 8 parts of multivitamin wherein, the artificial diet is prepared by:

smashing the root of Polygonum viviparum and the multivitamin into powder;

mixing the powder of the root of Polygonum viviparum, the soybean powder, the bran, the yeast powder, the sucrose, the casein, the agar and the water, and sterilizing the mixture; after the mixture is cooled to 55-60° C., adding the multivitamin, the choline chloride, the ascorbic acid, the sorbic acid and the nipagin into the mixture, and stirring the mixture to obtain the artificial diet.

2. The artificial diet according to claim 1, comprising by weight, 75 parts of root of *Polygonum viviparum*, 25 parts of soybean powder, 25 parts of bran, 15 parts of yeast powder, 10 parts of sucrose, 15 parts of casein, 10 parts of agar, 500 parts of water, 0.1 parts of choline chloride, 4.5 parts of ascorbic acid, 3 parts of sorbic acid, 3 parts of nipagin and 8 parts of multivitamin.

3. The artificial diet according to claim 1, wherein the root of *Polygonum viviparum* is dried root of *Polygonum viviparum*.

4. The artificial diet according to claim 1, further comprising an antibiotic, and an amount of the antibiotic is 0.01% by weight of the artificial diet.

5. The artificial diet according to claim 4, wherein the antibiotic comprises cephalosporin, streptomycin sulfate and chloramphenicol, with a mass ratio of 2:2:1.

6. A method for preparing an artificial diet for ghost moth larvae, comprising the following steps:

providing by weight, 25-75 parts of root of Polygonum viviparum, 25 parts of soybean powder, 25 parts of bran, 15 parts of yeast powder, 10 parts of sucrose, 15 parts of casein, 10 parts of agar, 500 parts of water, 0.1 parts of choline chloride, 4.5 parts of ascorbic acid, 3 parts of sorbic acid, 3 parts of nipagin and 8 parts of multivitamin;

smashing the root of *Polygonum viviparum* and the multivitamin into powder, mixing the powder of the root of *Polygonum viviparum*, the soybean powder, the bran, the yeast powder, the sucrose, the casein, the agar and the water, and sterilizing the mixture; after the mixture is cooled to 55-60° C., adding the multivitamin, the choline chloride, the ascorbic acid, the sorbic acid and the nipagin into the mixture, and stirring the mixture to obtain the artificial diet.

* * * * *